(12) United States Patent
Cojan et al.

(10) Patent No.: US 7,115,242 B2
(45) Date of Patent: Oct. 3, 2006

(54) METHOD FOR THE SYNTHESIS OF FERRATES

(75) Inventors: Jean-Yves Cojan, Neuilly sur Seine (FR); David Verschuere, Le Val David (FR); Farouk Tedjar, Grenoble (FR)

(73) Assignee: INERTEC, Nanterre (FR)

( * ) Notice: Subject to any disclaimer, the term of this patent is extended or adjusted under 35 U.S.C. 154(b) by 285 days.

(21) Appl. No.: 10/864,884

(22) Filed: Jun. 10, 2004

(65) Prior Publication Data

US 2004/0253171 A1    Dec. 16, 2004

(30) Foreign Application Priority Data

Jun. 11, 2003   (FR) .................................. 03 06976

(51) Int. Cl.
*C01G 1/00*   (2006.01)
*C01G 49/00*  (2006.01)

(52) U.S. Cl. .................. 423/594.2; 423/155; 423/179; 423/138

(58) Field of Classification Search ............. 423/594.1, 423/594.2, 155, 179, 138
See application file for complete search history.

(56) References Cited

U.S. PATENT DOCUMENTS

| | | | | |
|---|---|---|---|---|
| 2,835,553 A | * | 5/1958 | Rufford et al. .......... 423/594.2 |
| 4,385,045 A | * | 5/1983 | Thompson ............... 423/594.2 |
| 4,405,573 A | * | 9/1983 | Deininger et al. ....... 423/150.1 |
| 4,500,499 A | * | 2/1985 | Kaczur et al. ............. 423/139 |
| 4,545,974 A | * | 10/1985 | Thompson ............... 423/594.2 |
| 4,551,326 A | * | 11/1985 | Thompson ............... 423/594.2 |
| 4,606,843 A | * | 8/1986 | Kaczur .................. 252/186.33 |
| 5,093,091 A | | 3/1992 | Dauplaise et al. |
| 5,284,642 A | | 2/1994 | Evrard et al. |
| 6,790,429 B1 | * | 9/2004 | Ciampi .................... 423/594.1 |
| 2005/0053543 A1 | * | 3/2005 | Kneip et al. ............. 423/594.2 |

FOREIGN PATENT DOCUMENTS

WO    91 07352    5/1991
WO    03 042106   5/2003

OTHER PUBLICATIONS

Hollemann et al, "Lehrbuch der Anorganischen Chemie, 101. Auflage", 1995, p. 598.

* cited by examiner

*Primary Examiner*—Timothy C. Vanoy
(74) *Attorney, Agent, or Firm*—Dennison, Schultz & MacDonald

(57) ABSTRACT

A method of synthesis of alkali metal ferrates and alkaline earth metal ferrates, in which a trivalent iron compound is mixed with potash and optionally persulphate, and the mixture is heated at a temperature in the range of about 250 to about 500° C. for about 1 to 10 hours. The invention also relates to the use of the ferrates obtained by this method.

17 Claims, No Drawings

METHOD FOR THE SYNTHESIS OF FERRATES

The present invention relates to a method of manufacturing alkali metal ferrates and alkaline earth metal ferrates, and to the use of the ferrates thus obtained.

The invention can be applied notably in the field of water treatment and in the field of alkaline batteries.

Ferrates are strong oxidising agents which are obtained by oxidation of iron in valence state III into iron in valence state VI. These products have been known for more than a century. They were reported for the first time in 1841 by Fremy, and were then described by Stahl as from 1884 (J. Prakt. Chem., 32, 448, 1884).

Several methods of synthesis by chemical oxidation have been proposed as from the 1950's. According to one of these methods, in J. Am. Chem. Soc., 73, 1379, 951, Fe (VI) salts are obtained by reaction of a solution of soda and calcium hypochlorite with an Fe(III) salt such as $Fe(NO_3)_3$. Another method, which is described in Anal. Chem., 26, 1957, 1954, relates to obtaining an Fe(VI) salt such as $BaFeO_4$ by precipitation of another Fe(VI) salt such as $K_2FeO_4$.

More recently, U.S. Pat. No. 5,284,642 describes a method for the solid state synthesis of an alkali metal sulphatoferrate or alkaline earth metal sulphatoferrate, of formula $M(Fe,S)O_4$, in which M represents two atoms of sodium or potassium, or a calcium or barium atom. This method makes use of the reaction of ferrous sulphate, $FeSO_4$ $0.7H_2O$ with calcium hypochlorite and potash. An improvement of this method is described in the application FR-A-2,800,056, wherein sodium hypochlorite is replaced by chlorine gas, $Cl_2$.

These methods do nevertheless have some drawbacks:
chlorine gas is a dangerous and noxious reagent,
chlorine-containing effluents, the treatment of which remains problematic, are produced in significant amounts,
yields of ferrate are low,
the chlorine-containing species can lead in alkaline media to the formation of chlorates, which are not very stable and are explosive compounds,
the behaviour of the materials in the presence of chlorine and in the hot is problematic. Only special and expensive alloys can be used.

A problem that the present invention proposes solving is to provide a method of synthesis of alkali metal ferrates and alkaline earth metal ferrates which does not necessitate the use of reagents which are dangerous and/or harmful to health.

Another problem that the present invention proposes solving is to provide a method of synthesis of alkali metal ferrates and alkaline earth metal ferrates which is economical due to the fact that it does not necessitate recycling or removing effluents which are delicate or dangerous to manipulate.

Another problem that the present invention proposes solving is to provide a method which enables alkali metal ferrates and alkaline earth metal ferrates to be obtained with a yield which is acceptable for an industrial production.

It has now been discovered, in a surprising way, and this is the basis of the invention, that the use of persulphate as oxidising agent in the synthesis of ferrates brings about a solution to the problems set forth above.

Thus, according to a first aspect, the invention relates to a method of synthesis of alkali metal ferrates and alkaline earth metal ferrates, which comprises the following steps:

a) a trivalent iron compound is mixed with potash and optionally a persulphate; and
b) the mixture is heated at a temperature in the range of about 250 to about 500° C. for about 1 to 10 hours, preferably for about 4 to 8 hours.

Advantageously, the mixture mentioned above is heated by applying a temperature gradient. For example, it is possible to heat the mixture in a step b1) at a temperature in the range of about 250 to about 350° C. for about 1 to 5 hours. If the persulphate has not been added in step a), it is added in a step b2), to the product obtained in step b1). The addition is generally done after cooling said product. It is also possible to add potash with the persulphate. In a last step b3), the product obtained in step b1) or in step b2) is heated at a temperature in the range of about 375 to about 500° C. for about 1 to 5 hours.

The ferrate synthesised is then recovered in a conventional manner, and it is optionally converted into another ferrate (e.g. an alkali metal ferrate can be converted into an alkaline earth metal ferrate as indicated above).

The trivalent iron compound which can be used within the context of the invention is a ferric salt for example, notably ferric sulphate ($Fe_2(SO_4)_3$), which is hydrated or not, or an iron oxide, notably in the form of a pigment, such as goethite ($\alpha$-FeOOH) or haematite ($\alpha$-$Fe_2O_3$). Ferric sulphate can be obtained according to the method described in the application WO 02/090270. Iron oxides can be obtained for example according to the methods described in the applications EP-A-1,064,226, EP-A-1,106,577, EP-A-1,132,343. The Fe(III) compound is advantageously in solid form. When this compound is in the form of a solution, the latter is advantageously neutralised in order to precipitate and recover the iron compound in solid form. The neutralisation can be done for example with the aid of soda, lime, or magnesia.

According to a particular embodiment of the invention, the iron (III) compound can be obtained from an iron (II) compound, notably a ferrous salt. For example, a solution of ferrous sulphate ($Fe(SO_4)_2$), which is a by-product of the manufacture of titanium dioxide $TiO_2$, is neutralised as indicated above. The neutralised solution is then oxidised, e.g. by means of hydrogen peroxide, air, oxygen-enriched air, or oxygen gas, and the iron (III) compound is recovered according to conventional techniques.

The persulphate is indifferently used in sodium form ($Na_2S_2O_8$), potassium form ($K_2S_2O_8$), or ammonium form (($NH_4$)$_2S_2O_8$). It is commercially available in sodium and potassium form. In general, the amount of persulphate is in a stoichiometric excess of about 1 to 15% with respect to the amount of iron (III) compound.

Potash (KOH) is generally commercially available as pellets; it is used in a stoichiometric excess of about 0.5 to about 10% with respect to the amount of iron (III) compound.

The method of the invention makes use of persulphate, which is a stable compound which is not very toxic and has a good oxidising power.

Thus, according to a second aspect, the invention relates to the use of sodium persulphate, potassium persulphate or ammonium persulphate as oxidising agent in the synthesis of alkali metal ferrates or alkaline earth metal ferrates.

The synthetic method in accordance with the invention enables ferrates of $MFeO_4$ type to be obtained, wherein M represents either two alkali metal atoms, such as lithium, sodium, or potassium, or an alkaline earth metal atom, such as magnesium, calcium, or barium. The synthetic method of the invention also enables ferrates of $M(Fe,X)O_4$ type to be obtained, wherein M is as defined above and X is an atom selected from Al, Si, P, S, Cl, Mo, Mn, and Cr. However, with the view to the use of the product in water treatment, the pollutant elements such as chromium are to be proscribed.

The ferrates obtained according to the method of the invention are, due to their strong oxidising power, notably useful as water treatment agents, notably agents for treating waste water (see the article in Rev. Sci. Eau 1996, 1 : 17–30, with regard to this), and as cathodes in alkaline batteries (see U.S. Pat. No. 6,387,569 with regard to this).

The invention is illustrated by the following Examples, which are given purely as an illustration.

EXAMPLE 1

Synthesis of Potassium Ferrate 5 g of Fe(III), expressed in $Fe_2O_3$ equivalents, is weighed out, and is mixed with 3.5137 g of KOH. This mixture is placed in a nickel crucible and is then heated in an oven at 300° C. for 4 hours. After cooling, 15.5 g of KOH and 28 g of $K_2S_2O_8$ is added, and the whole is homogenised. The sample is put back in the oven at 400° C. for 3 hours.

After cooling in a desiccator, 47 g of product is obtained which is then ground and analysed by X-ray diffraction. The diffraction profile shows the presence of lines of $K_2FeO_4$ only.

EXAMPLE 2

Synthesis of Potassium Ferrate 1 g of iron (III), expressed in $Fe_2O_3$ equivalents, is weighed out, which is mixed with 5.85 g of $K_2S_2O_8$ and 3.5 g of KOH in ground pellets. This mixture is placed in a nickel crucible and is then heated in an oven at 300° C. for 3 hours, and then for 1 hour at 400° C.

The reaction can be represented in the following way:

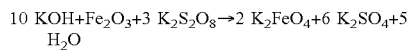

After cooling, 9.8 g of product is collected which is placed in the desiccator and is then analysed by X-ray diffraction. The diffraction profile shows the presence of $KFeO_2$ lines and $K_2FeO_4$ lines, and the formation of $K_2SO_4$.

EXAMPLE 3

Synthesis of an Iron (III) Compound

A solution containing $FeSO_4$ in acid medium is used as iron source. The pH of the starting solution is 0.6 and the redox potential equilibrates around E=−117 mV/ECS. This indeed confirms that the iron is in divalent form. This solution is neutralised by means of 30% soda at the rate of 150 ml per 100 ml of iron (II) solution. After neutralisation, the pH attains the value of 5.8, while the redox potential of the solution equilibrates around −168 mV/ECS. This value indicates that the iron is still in Fe(II) form.

The solution is then oxidised by means of hydrogen peroxide, at the rate of 1.3 ml of 35% $H_2O_2$ per 50 ml of Fe(II) solution. The pH regulates during this oxidation to a value of 3.8. The end of the oxidation is indicated by the jump of potential which passes from −168 mV to +511 mV/ECS. This value indicates that the iron is in Fe(III) form.

After one hour's agitation to ensure crystal growth, the resulting pulp is filtered. 6.5 g of yellow precipitate (goethite) is obtained which, when dried, can serve as source of iron in the preparation of a ferrate according to the method described in Example 2.

The filtrate only contains 39.2 mg/l of iron which thus indicates a high level of recovery of the iron.

What is claimed is:

1. A method of synthesis of alkali metal ferrates and alkaline earth metal ferrates, comprising the steps of:
   a) mixing a trivalent iron compound with potash and a persulphate; and
   b) heating the mixture at a temperature in the range of about 250 to about 500° C. for about 1 to 10 hours.

2. The method according to claim 1, comprising the steps of:
   b1) heating the mixture of step a) at a temperature in the range of about 250 to about 350° C. for about 1 to 5 hours; and
   b2) heating the product of step b1) at a temperature in the range of about 375 to about 500° C. for about 1 to 5 hours.

3. The method according to claim 1, in which the trivalent iron compound is a ferric salt or an iron oxide.

4. The method according to claim 3, in which the iron oxide is goethite or haematite.

5. The method according to claim 1, in which the trivalent iron compound is obtained from a divalent iron compound.

6. The method according to claim 5, in which the divalent iron compound is a ferrous salt.

7. The method according to claim 1, in which the persulphate is sodium persulphate, potassium persulphate, or ammonium persulphate.

8. The method according to claim 1, in which a stoichiometric excess of potash of about 0.5 to 10% is used with respect to the amount of trivalent iron.

9. The method according to claim 1, in which a stoichiometric excess of persulphate of about 1 to 15% is used with respect to the amount of trivalent iron.

10. A method of synthesis of alkali metal ferrates and alkaline earth metal ferrates, comprising the steps of:
    a) mixing a trivalent iron compound with potash;
    b) heating the mixture of step a) at a temperature in the range of about 250 to about 350° C. for about 1 to 5 hours;
    c) adding a persulphate to the heated mixture; and
    d) heating the product of step c) at a temperature in the range of about 375 to about 500° C. for about 1 to 5 hours.

11. The method according to claim 10, in which the trivalent iron compound is a ferric salt or an iron oxide.

12. The method according to claim 11, in which the iron oxide is goethite or haematite.

13. The method according to claim 10, in which the trivalent iron compound is obtained from a divalent iron compound.

14. The method according to claim 13 in which the divalent iron compound is a ferrous salt.

15. The method according to claim 10, in which the persulphate is sodium persulphate, potassium persulphate, or ammonium persulphate.

16. The method according to claim 10, in which a stoichiometric excess of potash of about 0.5 to 10% is used with respect to the amount of trivalent iron.

17. The method according to claim 10, in which a stoichiometric excess of persulphate of about 1 to 15% is used with respect to the amount of trivalent iron.

* * * * *